Aug. 3, 1965  R. P. THORN  3,198,506

MOUNTING

Filed Feb. 19, 1963

INVENTOR.
Richard P Thorn
BY
Ralph Hammar
Attorney

3,198,506
MOUNTING
Richard P. Thorn, Erie, Pa., assignor to Lord Manufacturing Company, Erie, Pa., a corporation of Pennsylvania
Filed Feb. 19, 1963, Ser. No. 259,679
4 Claims. (Cl. 267—1)

This invention is a mounting of simplified construction which, in a preferred form, provides damping and snubbing in all radial and axial directions. The mounting is of particular advantage for isolating low frequency vibrations.

Figure 1:
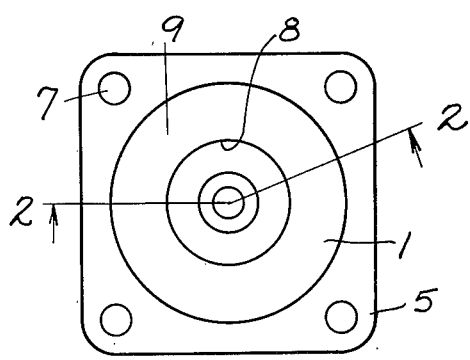
Figure 3:
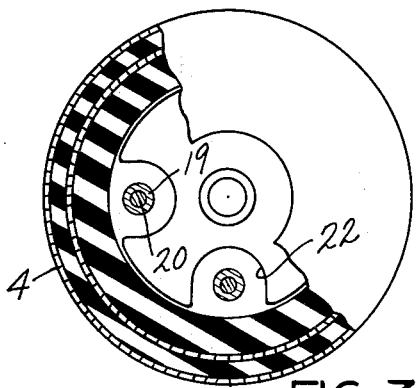
Figure 2:
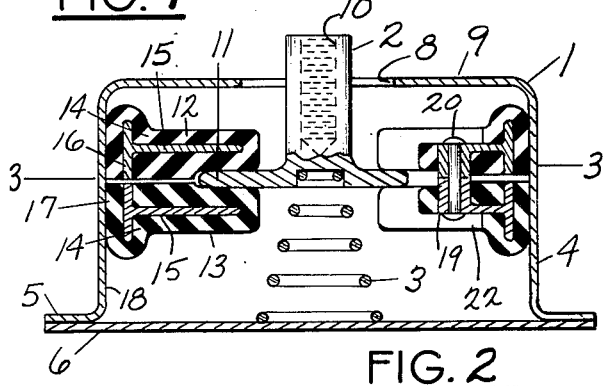
Figure 4:
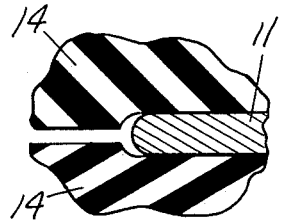
Figure 5:
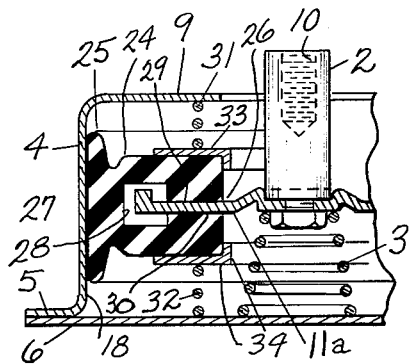
Figure 6:
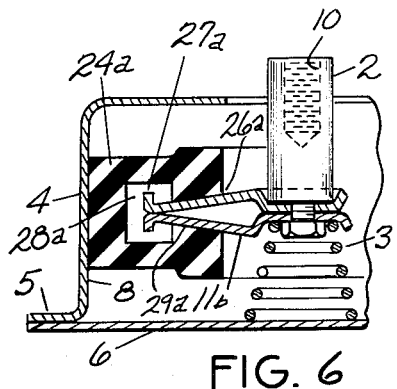

In the drawing, FIG. 1 is a top plan of the mounting, FIG. 2 is a section on line 2—2 of FIG. 1, FIG. 3 is a section on line 3—3 of FIG. 2, FIG. 4 is a detail illustrating the radial damping, and FIGS. 5 and 6 are fragmentary sectional elevations of modifications.

The mounting has supporting and supported members 1 and 2 and a spring 3 arranged in load carrying relation between the members. The stiffness of the spring is related in the usual manner to the vibration frequencies to be isolated to provide the desired isolation.

The member 1 comprises a cup 4 with an outwardly projecting flange 5 at the rim secured to a bottom plate 6 and provided with attaching holes 7. The member 2 has a stem projecting through a clearance opening 8 in the bottom wall 9 of the cup with its upper end threaded at 10 for an attaching screw and its lower end provided with an outwardly projecting flange 11.

To limit the relative movement between the supporting and supported members, damping in all directions is provided by members 12 and 13 respectively above and below the flange 11. The members 12 and 13 preferably are of identical construction and each comprises a disc 14 of rubber or other elastomer having embedded therein a metal disc 15 having a rim 16. The purpose of the metal disc is to reinforce the body 14. The central part of the disc 15 reinforces the central portion of the body and the rim 16 of the metal disc reinforces the rim 17 of the body. As molded, the outside diameter of the rim 17 is larger than the inside diameter of the cylindrical portion 18 of the cup 4 so that when installed, the rim 17 is under radial compression, producing a friction grip on the inner surface of the section 18 of the cup. This friction grip provides damping in vertical or axial directions. Toward the center, the reinforcing discs 15 are provided with projections 19 which are clamped together by a rivet 20. The projections 19 are at the center of projections 21 on the body 14 which fit in radial notches 22 in the flange 11. When the projections 19 are secured together, the flange 11 is clamped between the rubber bodies 14 as illustrated in FIG. 4, thereby producing a friction grip on the flange which provides damping in lateral or radial directions. The riveting of the projections 19 provides the control clamping force on the flange 11 for the lateral or radial damping.

Snubbing in vertical or axial directions is obtained by abutment of the rims 17 with either the bottom plate 6 or the bottom wall 9 of the cup. Snubbing in lateral or radial directions is obtained by abutment of the member 2 with the upper body 14.

While the elastomer 14 will ordinarily have sufficient abrasion resistance to provide damping for the life of the mounting, the rubbing surfaces may be provided with an additional wear resistant covering such as nylon cloth or other wear resistant material.

In the modification of FIG. 5, there is no change in the construction of the member 1 and the load carrying spring 3 and the change in the member 2 consists of a separate steel stamping 11a instead of the integral flange 11.

The damping is provided by a body 24 of suitable elastomer having an outer rim 25 frictionally engaging the wall 18 of the cup 4, to provide damping in vertical or axial directions. At the inner edge of the body 24 is a slot 26 through which the rim 27 of the stamping 11a may be inserted. The rim 27 is received within an internal cavity 28 of substantially greater radial width than the thickness of the rim 27.

The disc 11a is clamped between surfaces 29 and 30 on the body 24 and if the inherent resilience does not provide the desired friction grip, the clamping action may be supplemented by the force exerted by springs 31 and 32 acting respectively between the bottom wall 9 of the cup 4 and a ring 33 and between the upper side of the bottom plate 6 and a ring 34.

Snubbing in vertical or axial directions is provided by engagement of the rim 25 with the bottom wall 9 of the cup or with the bottom plate 6. Snubbing in radial or lateral directions is provided by engagement of the rim 27 with the inner and outer radial walls of the cavity 28.

In the modification of FIG. 6, there are two stampings 11b attached to the bottom of the member 2. The stampings may be arranged back to back with rims 27a extending away from each other. The body 24a of elastomer has its internal cavity 28a enlarged to receive the rims 27a and provide snubbing in radial or lateral directions. The stampings 11b are dished away from each other so that upon movement through the slot 26a in a radial direction, the surfaces 29a are pushed further apart, thereby increasing the damping. In other respects, the construction and operation is similar to FIG. 5.

What is claimed as new is:

1. A resilient mounting having supporting and supported members with spring means therebetween for carrying the vertical load, one of the members having a vertical cylindrical surface the other of the members having a flange presented edgewise toward said surface, said flange being of diameter smaller than the diameter of said surface, a member comprising portions of elastomer having a rim of unstressed diameter larger than the diameter of said surface, said rim frictionally engaging and squeezed inward by said surface and resisting movement in vertical directions, said elastomer portions having a central portion embracing and frictionally engaging opposite sides of said flange and resisting movement in lateral directions.

2. A resilient mounting having supporting and supported members with spring means therebetween for carrying the vertical load, one of the members having a vertical cylindrical surface, the other of the members having a flange presented edgewise toward said surface, said flange being of diameter smaller than the diameter of said surface, two bodies of elastomer each body having a rim of unstressed diameter larger than the diameter of said surface, said rim frictionally engaging and squeezed inward by said surface and resisting movement in vertical directions, and each body having a central portion frictionally engaging one side of said flange, said bodies being arranged to embrace said flange, and means in said bodies clamped together and preloading the bodies against said flange.

3. A resilient mounting having supporting and supported members with spring means therebetween for carrying the vertical load, one of the members having a vertical cylindrical surface, the other of the members having a flange presented edgewise toward said surface, said flange being of diameter smaller than the diameter of said surface, a member comprising portions of elastomer having a rim of unstressed diameter larger than the diameter of said surface, said rim frictionally engaging and squeezed inward by said surface and resisting movement in vertical directions, said elastomer portions having at the center a slot receiving said flange and with surfaces on opposite sides of the slot frictionally engaging said flange and resisting movement in lateral directions.

4. The mounting of claim 3 in which the flange has diverging surfaces engaging said surfaces of the slot to alter the frictional resistance in lateral directions in accordance with the lateral displacement of said other member.

References Cited by the Examiner

UNITED STATES PATENTS

| | | | |
|---|---|---|---|
| 2,882,040 | 4/59 | Cottrell | 267—9 |
| 2,896,937 | 7/59 | Miller | 267—1 |
| 2,900,162 | 8/59 | Crede et al. | 248—358 |
| 2,906,523 | 9/59 | Painter | 267—1 |
| 2,917,265 | 12/59 | Markowski | 267—1 X |

FOREIGN PATENTS 117,883   1959   U.S.S.R.

ARTHUR L. LA POINT, *Primary Examiner.*